United States Patent
Iwadate

(10) Patent No.: US 9,365,060 B2
(45) Date of Patent: Jun. 14, 2016

(54) APPARATUS FOR MOTOR CONTROL OF AN APPARATUS WITH A MOTOR

(75) Inventor: Yasuhiro Iwadate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1160 days.

(21) Appl. No.: 13/015,449

(22) Filed: Jan. 27, 2011

(65) Prior Publication Data

US 2011/0190960 A1 Aug. 4, 2011

(30) Foreign Application Priority Data

Jan. 29, 2010 (JP) .................. 2010-019449

(51) Int. Cl.
*G05D 1/02* (2006.01)
*B41J 19/20* (2006.01)
*H04N 1/047* (2006.01)
*H04N 1/12* (2006.01)
*H04N 1/191* (2006.01)

(52) U.S. Cl.
CPC ............... *B41J 19/202* (2013.01); *H04N 1/047* (2013.01); *H04N 1/12* (2013.01); *H04N 1/1911* (2013.01); *H04N 2201/0471* (2013.01); *H04N 2201/04755* (2013.01)

(58) Field of Classification Search
CPC ........................................................ G05D 1/02
USPC .............................. 700/302; 347/179; 399/76
See application file for complete search history.

(56) References Cited

U.S. PATENT DOCUMENTS

| | | | |
|---|---|---|---|
| 5,444,525 A * | 8/1995 | Takahashi et al. | 399/76 |
| 2001/0028231 A1* | 10/2001 | Tanaka | 318/445 |
| 2002/0051028 A1* | 5/2002 | Kobayashi | B65H 5/062 347/19 |
| 2002/0093561 A1* | 7/2002 | Ozaki et al. | 347/179 |
| 2010/0164417 A1* | 7/2010 | Tsumoto | 318/400.23 |

FOREIGN PATENT DOCUMENTS

JP 2003-260842 A 9/2003
JP 2008-211869 A 9/2008

* cited by examiner

*Primary Examiner* — Tejal Gami
(74) *Attorney, Agent, or Firm* — Canon USA Inc. IP Division

(57) ABSTRACT

An apparatus includes a driven object, a motor configured to function as a driving source of the driven object, a scanning unit configured to cause the driven object to move, and include a first pulley to which the motor is connected, a second pulley disposed opposing to the first pulley, and a member stretched around the first pulley and the second pulley, an acquisition unit configured to acquire position information of the driven object, and a signal generation unit configured to generate a periodic signal for controlling driving of the motor based on the position information acquired by the acquisition unit, wherein the signal generation unit increases a period of the signal to be generated, as a length of the member to which a pulling force is applied becomes shorter.

9 Claims, 10 Drawing Sheets

| | PHASE CORRECTION AMOUNT mm | |
|---|---|---|
| | FORWARD PATH | BACKWARD PATH |
| A1 | 0.2 | 0.3 |
| A2 | 0.1 | 0.4 |
| A3 | 0 | 0.5 |

APPARATUS FOR MOTOR CONTROL OF AN APPARATUS WITH A MOTOR

BACKGROUND OF THE INVENTION

1. Field of the Invention

The present invention relates to motor control in an apparatus equipped with a motor, such as a recording apparatus.

2. Description of the Related Art

Examples of apparatuses equipped with a motor include a recording apparatus and an image reading apparatus. In the recording apparatus, a recording head is driven by a motor. In the image reading apparatus, a reading unit is driven by a motor. The drive force of the motor includes a so-called torque ripple (i.e., cogging torque, hereinafter referred to as "cogging"). Due to this cogging, the rotational speed of the motor includes fluctuation of speed according to a cogging period. The recording head and the reading unit are attached to a member such as a belt, and are caused to move (scan) by a movement of the belt.

Japanese Patent Application Laid-Open No. 2008-211869 discusses a technique of making a correction by performing feedback (FB) control based on a difference between an actual speed and a target speed of a driven object, and further performing feed forward (FF) control for adding correction information based on speed information of previous motor driving operations.

Japanese Patent Application Laid-Open No. 2003-260842 discusses a technique for correcting a deviation of a carriage speed generated due to elongation and contraction of a belt at the time of carriage acceleration control and deceleration control.

However, since the recording apparatus and the image reading apparatus are affected by elongation and contraction of the belt, the speed control using the techniques discussed in Japanese Patent Application Laid-Open Nos. 2008-211869 and 2003-260842 cannot eliminate a speed change caused by the cogging.

SUMMARY OF THE INVENTION

According to an aspect of the present invention, an apparatus includes a driven object, a motor configured to function as a driving source of the driven object, a scanning unit configured to cause the driven object to move, and include a first pulley to which the motor is connected, a second pulley disposed opposing to the first pulley, and a member stretched around the first pulley and the second pulley, an acquisition unit configured to acquire position information of the driven object, and a signal generation unit configured to generate a periodic signal for controlling driving of the motor based on the position information acquired by the acquisition unit, wherein the signal generation unit increases a period of the signal to be generated, as a length of the member to which a pulling force is applied becomes shorter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

FIG. 1 illustrates a scanning mechanism (drive mechanism). A driven object (movable object) 2 is connected to a transmission member (belt) 6, and is moved(scanned) along a guide (not-illustrated). In the present exemplary embodiment, the scanning region (scanning range) is a section from the point HP to the point BP.

The belt 6 is stretched around a pulley (motor pulley) 8 coupled (connected) to a motor functioning as a driving source, and a pulley 9 disposed opposing to the motor 7. No driving source is connected to the pulley 9, which is a driven pulley. The pulley 8 includes teeth formed thereon, but the pulley 9 does not.

Figure 1A:
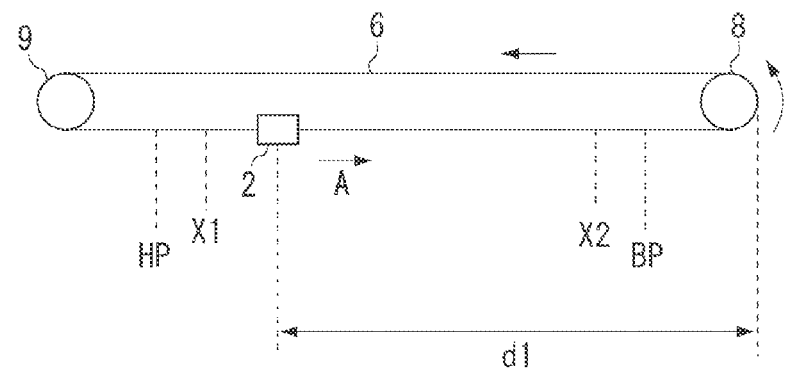
FIGS. 1A to 1C illustrate a configuration of an electronic apparatus.
Figure 1B:
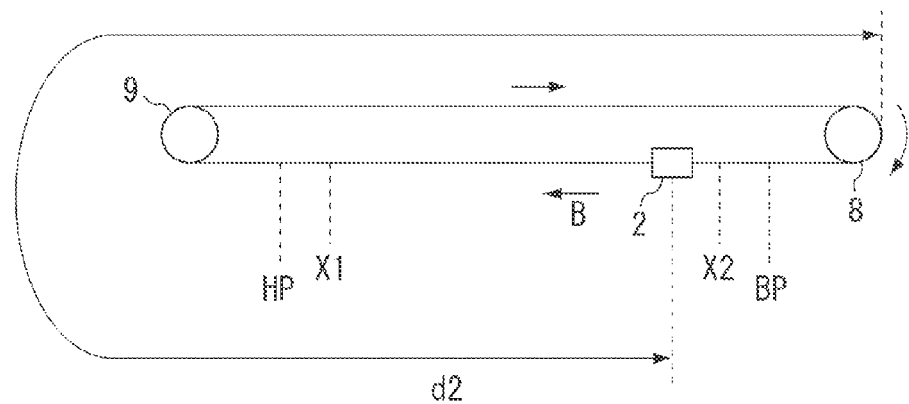

In FIG. 1A, the pulley 8 is rotated in the direction indicated by the arrow (counterclockwise direction), and the driven object (movable object) 2 is moved (scanned) in the A direction (from the driven pulley side to the motor pulley side). In FIG. 1B, the pulley 8 is rotated in the direction indicated by the arrow (clockwise direction), and the driven object 2 is moved in the B direction.

Figure 1C:
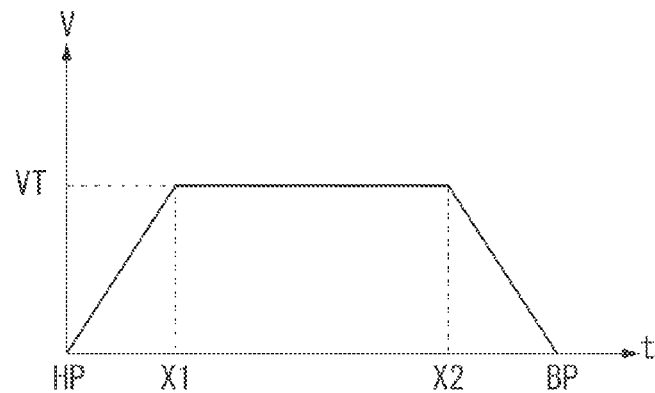

FIG. 1C is a graph illustrating movement control for moving (scanning) the driven object 2 from the point HP to the point BP. A control unit, which will be described later, performs acceleration control from the point HP to the point X1, constant speed control from the point X1 to the point X2, and deceleration control from the point X2 to the point BP. Under the constant speed control from the point X1 to the point X2, the control unit performs control so that the driven object 2 is moved at a speed VT. The load of the driven pulley 9 is negligibly small compared to the load of the driven object 2.

Figure 2:
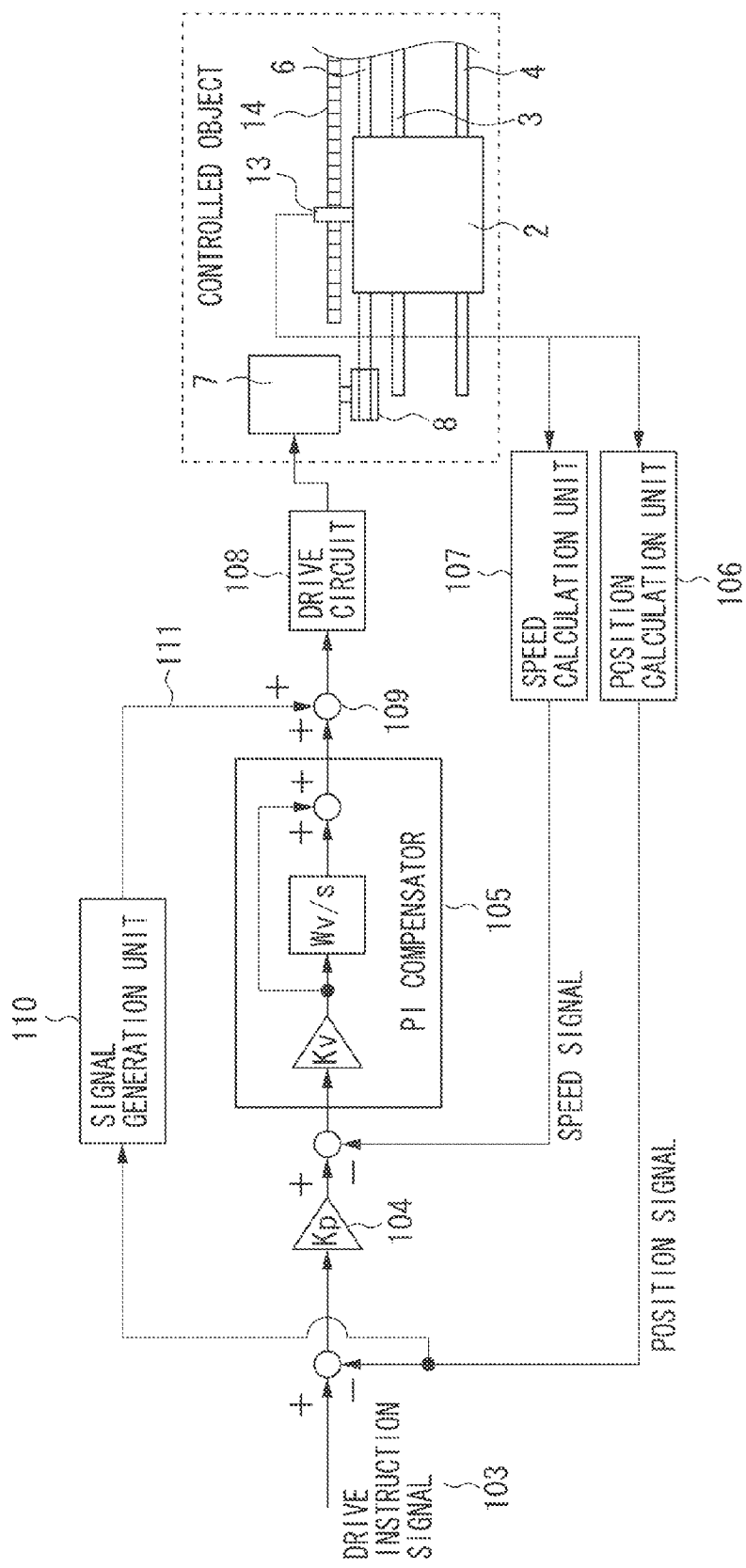
FIG. 2 is a schematic diagram illustrating a control configuration of the electronic apparatus.

FIG. 2 is a schematic diagram illustrating the scanning mechanism, and the control of the scanning mechanism.

A drive instruction signal (instruction value) 103 is a profile predetermined by a program. A position calculation unit 106 and a speed calculation unit 107 respectively calculate the position and the speed of the driven object 2 based on a signal which an encoder sensor 13 outputs when the sensor 13 detects an encoder slit 14.

Calculation units 104 and 105 perform feedback control (FB control) so that the driven object 2 is moved according to the drive instruction signal 103 based on the position signal and the speed signal about the driven object (movable object) 2, which are detected by the encoder sensor 13. The calculation unit 105 is used for proportional integral (PI) compensation, and outputs a first control signal.

A signal generation unit (periodic signal generation unit) 110 generates a periodic signal 111 (second control signal) for reducing a torque ripple generated at the motor 7.

$$\text{periodic signal} = \text{amplitude } A \times \sin(2 \times \pi \times \text{motor rotational angle} \theta + \text{phase } \phi) \quad (1)$$

$$\text{motor rotational angle} \theta = \text{encoder position signal} / \text{periodic vibration pitch} \quad (2)$$

The periodic signal has a sinusoidal waveform, but the waveform of the periodic signal maybe a rectangle waveform as long as it is periodic. The periodic vibration pitch means a spatial frequency of a torque ripple. For example, if the number of teeth of the pulley 8 is N (teeth) and the tooth pitch of the belt 6 is M (mm), the feed amount of the belt 6 is N×M (mm) when the motor completes one rotation. If the torque ripple pulsates P times during one rotation of the motor, the torque ripple pitch is (N×M)/P (mm).

The amplitude is an amplitude of a periodic signal output from the signal generation unit 110. In the present exemplary embodiment, the amplitude is described as the duty ratio (%) of the pulse-width modulation (PWM) calculation, but the amplitude is not limited thereto. The phase is a phase of a periodic signal 111 output from the signal generation unit 110. In the present exemplary embodiment, the origin point of the driven object 2 is used as the origin point of the position signal.

The signal generation unit 110 sets the amplitude value and the wavelength of a periodic signal so that the periodic signal has a same amplitude as and an opposite phase of a torque ripple generated at the motor 7. The signal generation unit 110 sets them based on information about elongation of the belt 6.

An output of the calculation unit 105 and an output of the signal generation unit 110 are added at an addition unit 109, a result of which is output to a drive circuit 108 (drive unit). The drive circuit 108 outputs a drive signal to the motor 7. Alternatively, the first control signal and the second control signal maybe respectively output to the drive circuit 108 (drive unit), and the drive circuit 108 may generate a drive signal from them.

Figure 3:
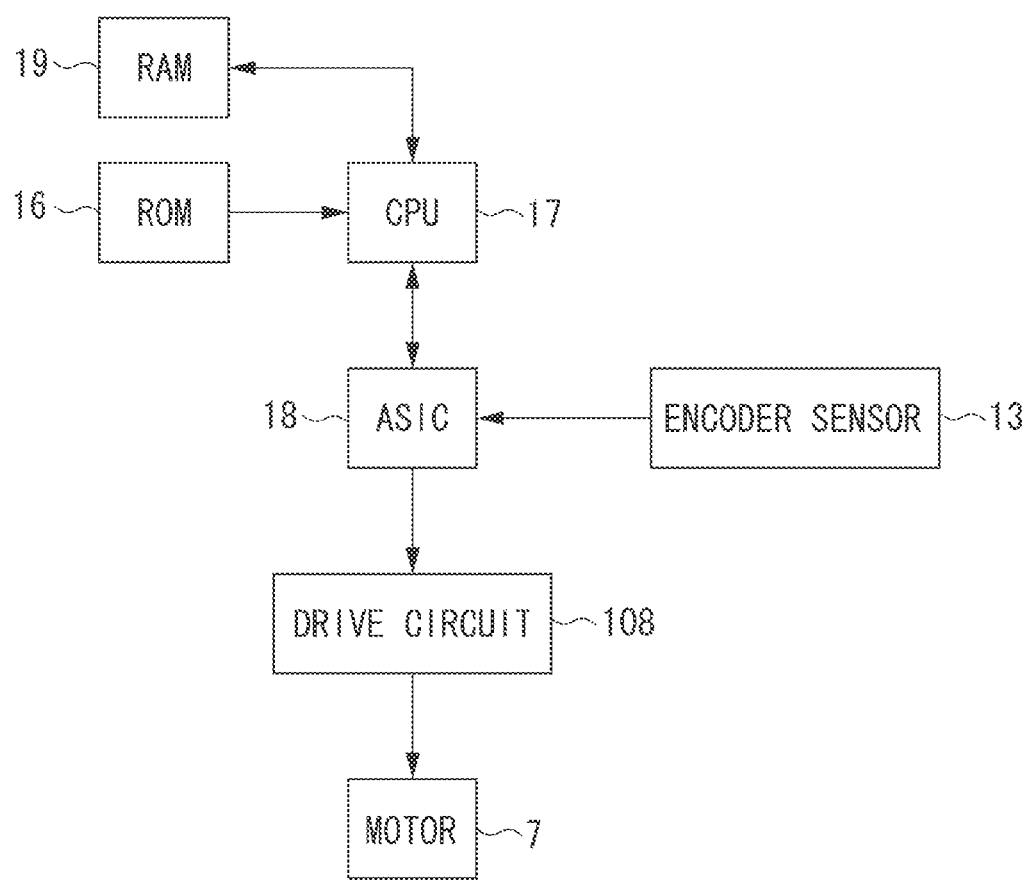
FIG. 3 is a block diagram illustrating a control block of the electronic apparatus.

FIG. 3 illustrates a control block of an electronic apparatus. A central processing unit (CPU) 17 executes a program stored in a read-only memory (ROM) 16. The CPU 17 is in charge of, for example, calculation for motor control. A random access memory (RAM) 19 stores data to be executed by the CPU 17.

An application specific integrated circuit (ASIC) 18 includes the signal generation unit 110, the speed calculation unit 107, and the position calculation unit 106, etc. illustrated in FIG. 2. The application specific integrated circuit (ASIC) 18 communicates with the CPU 17, and performs calculation processing, signal input processing, and signal output processing.

For example, a signal output from the encoder sensor 13 is input into the ASIC 18, and then the ASIC 18 outputs a signal to the drive circuit 108. The CPU 17 may be included in the ASIC 18 in the present exemplary embodiment.

Figure 4A:
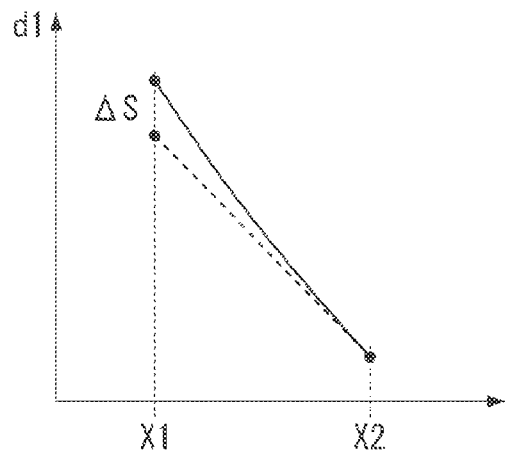
FIGS. 4A and 4B are graphs illustrating the state of a belt.

FIG. 4A illustrates the length of the belt 6 and the elongation of the belt 6 based on the position of the driven object (movable object) 2. FIG. 4A corresponds to FIG. 1A.

The vertical axis represents the length of the belt 6, and the horizontal axis represents the position of the driven object 2. The dotted line indicates the length of the belt 6 when it is assumed that the driven object is stopped, and the solid line indicates the length of the belt 6 when the driven object is moved at a predetermined speed. The difference between the dotted line and the solid line indicates an amount ($\Delta S$) of elongation of the belt 6 caused by motor driving.

Figure 4B:
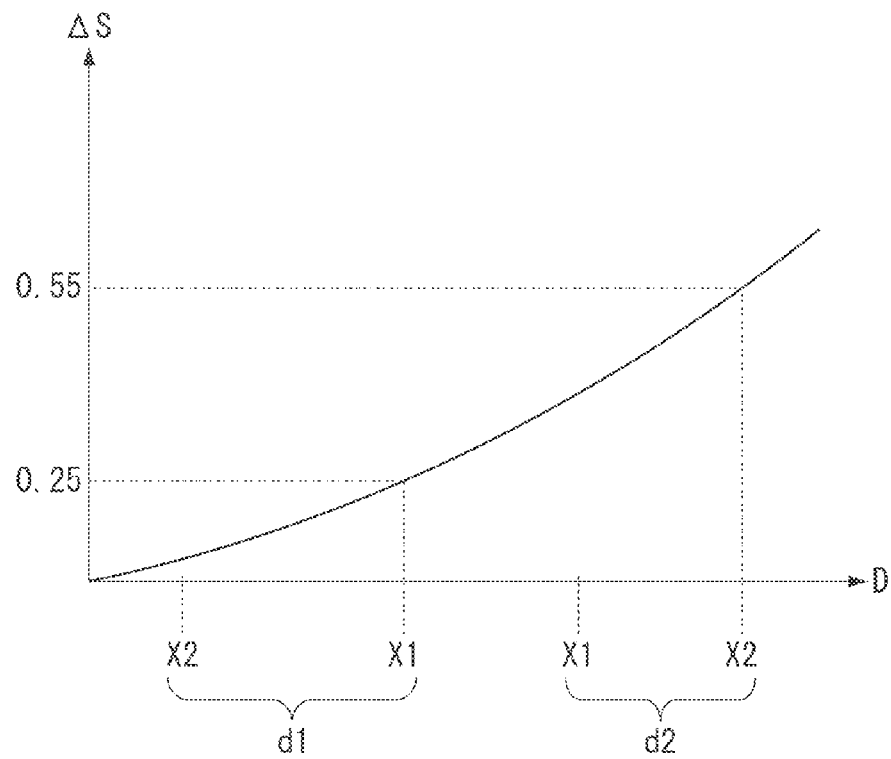

FIG. 4B is a graph in which the horizontal axis represents the length D of the transmission route of the force of the motor 7 for pulling the driven object, and the vertical axis represents the amount $\Delta S$ of elongation of the belt 6.

The range d1 on the horizontal axis indicates the movement range of the driven object illustrated in FIG. 1A, and the range d2 on the horizontal axis indicates the movement range of the driven object illustrated in FIG. 1B. For example, in the range d1, the maximum belt elongation amount is 0.25 mm. This elongation amount corresponds to 0.025% of the length of the belt 6, and in the range d2, the maximum elongation amount is 0.55 mm.

As illustrated in FIG. 4B, the relationship between the belt elongation amount $\Delta S$ and the length D of the transmission route of the force of the motor 7 for pulling the driven object, cannot be expressed by a liner expression. This relationship forms a downwardly protruding graph. The amount of elongation of the belt 6 per unit length also has similar characteristic.

Therefore, there is a difference in the belt elongation amount per unit length between, for example, the first scanning position (X1) and the second scanning position (X2) located relatively near to the motor pulley when the driven object is moving as illustrated in FIG. 1A.

Figure 5A:
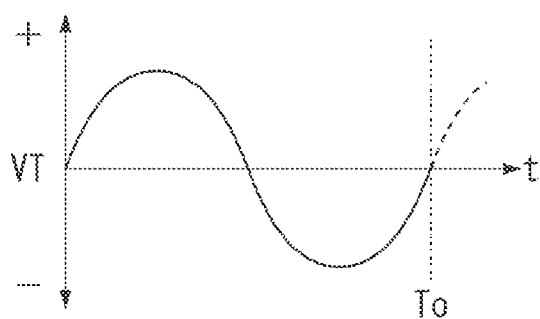
FIGS. 5A and 5B illustrate speed fluctuation of a driven object.
Figure 5B:
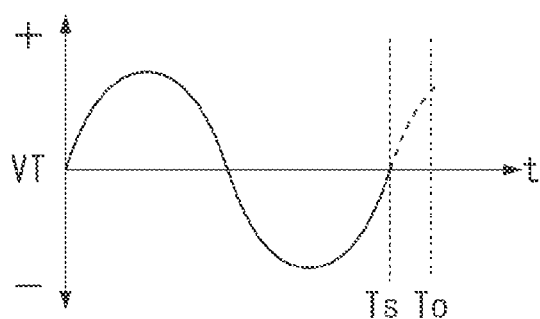

FIGS. 5A and 5B illustrate fluctuation in the speed of the driven object controlled to move at the predetermined speed VT. In both of FIGS. 5A and 5B, fluctuation occurs in the speed due to the influence of the cogging. It is assumed that a same force is applied to the belt 6.

FIG. 5A illustrates a speed fluctuation when there is no elongation of the belt 6 (the elongation amount per unit length is relatively small). In this case, the cogging period is To. On the other hand, FIG. 5B illustrates a speed fluctuation when there is elongation of the belt 6 (the elongation amount per unit length is relatively large). In this case, the cogging period is Ts. In this case, Ts is smaller than To (Ts<To).

The reason for this difference is the influence of elongation of the belt 6. When there is no elongation of the belt 6, a rotation of the motor by an angle $\theta$ causes a movement of the belt 6 supporting the driven object by a distance corresponding to the angle $\theta$. However, when there is elongation of the belt 6, the movement distance of the driven object becomes shorter than the distance corresponding to the rotation amount of the motor.

Figure 6A:
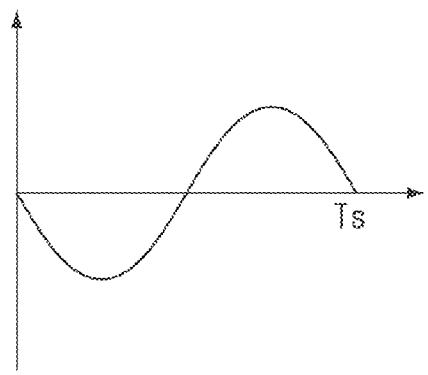
FIGS. 6A to 6C are graphs illustrating a periodic signal.
Figure 6B:
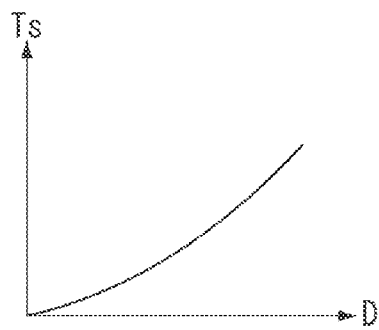

As illustrated in FIG. 6A, the signal generation unit 110 generates a control signal with a period Ts to reduce cogging with a cogging period Ts to thereby reduce the above-mentioned speed change. FIG. 6B illustrates the relationship between the length D of the transmission route of the force of the motor 7 for pulling the driven object, and the period Ts of the control signal. In the graph illustrated in FIG. 6B, similarly to the graph illustrated in FIG. 4B, the relationship between the length D and the period Ts cannot be expressed by a linear expression, and forms a downwardly protruding graph.

The signal generation unit 110 includes an acquisition unit for acquiring the period Ts, which is period information. This acquisition unit acquires information about the movement direction and position of the driven object, and based on this information, acquires the period Ts, which is the period information, from a table. The signal generation unit 110 outputs a signal with this period Ts.

Referring to FIGS. 1A and 1B, and FIG. 6B, as the length of the member pulling the driven object 2 toward the pulley 8 becomes shorter, the signal generation unit 110 increases the period of a signal to be generated. In other words, as the length of the belt 6 to which a pulling force is applied becomes shorter, the signal generation unit 110 increases the period of a signal to be generated.

On the contrary, the length of the belt 6 to which a pulling force is applied becomes longer, the signal generation unit 110 reduces the period of a signal to be generated.

In FIG. 1A, a movement of the driven object 2 to the right reduces the length of the member pulling the driven object 2 toward the pulley 8. On the other hand, in FIG. 1B, a movement of the driven object 2 to the left reduces the length of the member pulling the driven object 2 toward the pulley 8. In this way, the present exemplary embodiment performs control so that the period Ts is set based on the length of the member pulling the driven object 2 toward the pulley 8.

As another example, the signal generation unit 110 increases the period of a signal to be generated, when the length of the member pulling the driven object 2 toward the pulley 8 is reduced by a predetermined amount. On the other hand, the signal generation unit 110 reduces the period of a signal to be generated, when the length of the member pulling the driven object 2 toward the pulley 8 is increased by a predetermined amount.

The above-described control will be further described below. As illustrated in FIG. 1A, for moving the driven object from the pulley 9 to the pulley 8, the signal generation unit 110 sets a first region (a region including X1) and a second region (a region including X2) in the moving direction of the driven object 2.

The signal generation unit 110 sets the length of the period of a signal so that the period of a signal generated by the signal generation unit 110 at the time of moving the driven object 2 in the first region becomes shorter than the period of a signal generated by the signal generation unit 110 at the time of moving the driven object 2 in the second region.

Further, as illustrated in FIG. 1B, for moving the driven object from the pulley 8 to the pulley 9, the signal generation unit 110 sets a third region (a region including X2) and a fourth region (a region including X1) in the moving direction of the driven object 2.

The signal generation unit 110 sets the length of the period of a signal so that the period of a signal generated by the signal generation unit 110 at the time of moving the driven object 2 in the third region becomes shorter than the period of a signal generated by the signal generation unit 110 at the time of moving the driven object 2 in the fourth region.

Figure 7A:
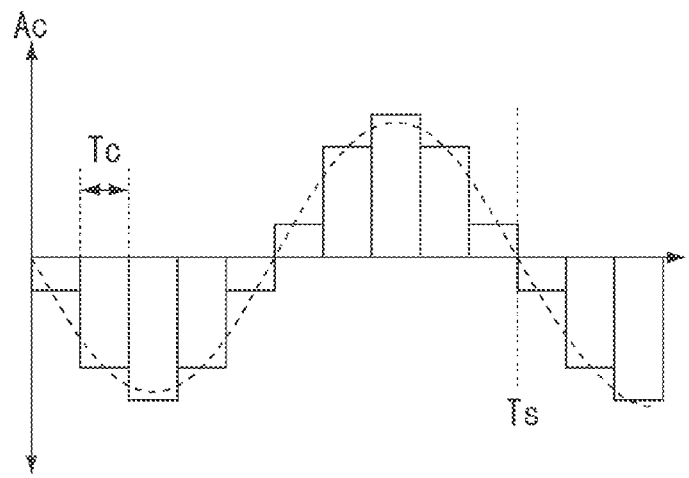
FIGS. 7A and 7B are graphs illustrating the periodic signal.
Figure 7B:
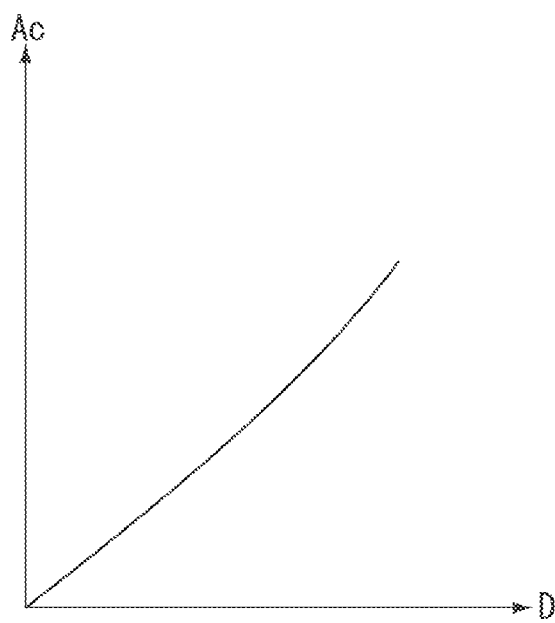

Next, a specific example of the output of the above-mentioned periodic signal 111 will be described. FIG. 7A illustrates a direct-current signal with an amplitude Ac, which is output so as to have a servo period Tc. This table of the amplitude Ac corresponds to FIG. 6B.

Figure 6C:
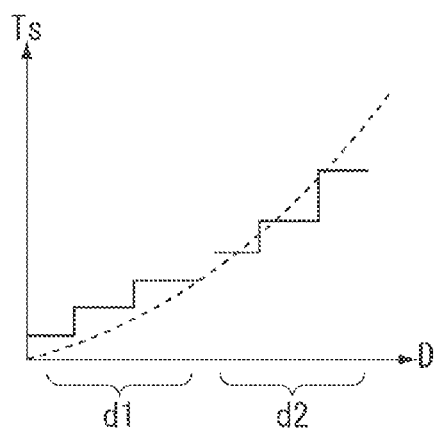

As illustrated in FIG. 6C, when the change in the value of the period Ts is small, or for the purpose of reducing the data amount and the control load, for example, the signal generation unit 110 may perform control so that the moving range for each direction is divided into three regions (first region, second region, and third region), and only three values are used as the value of the period Ts. Alternatively, the signal generation unit 110 may perform control so that a region considerably influenced by the cogging is selected from a plurality of regions for each of the forward direction and rearward direction, and the signal generation unit 110 outputs a control signal with the period corresponding to that region.

Figure 8:
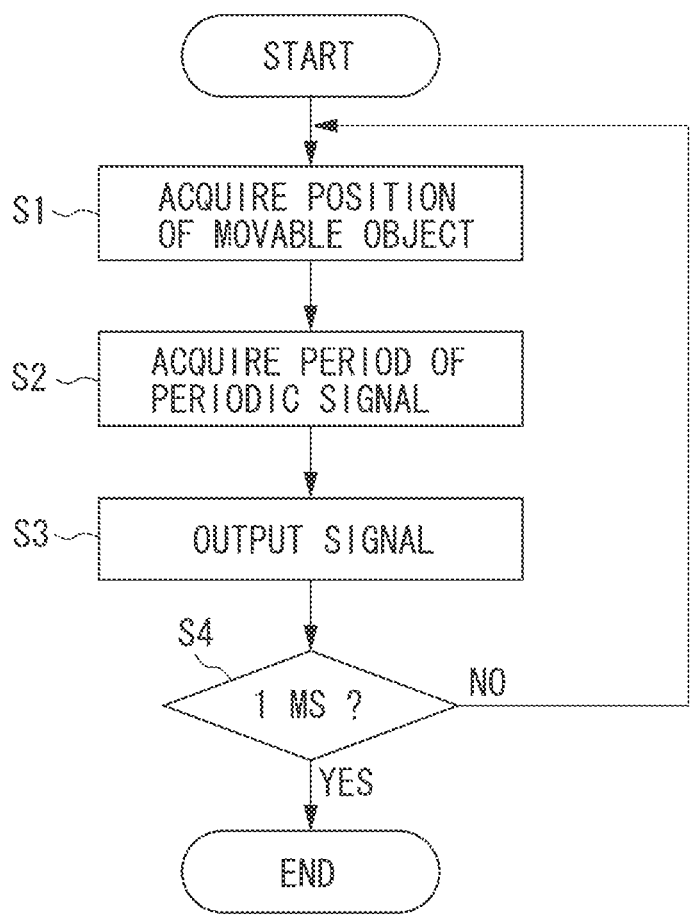
FIG. 8 is a flowchart illustrating a control flow of the electronic apparatus.

FIG. 8 is a flowchart illustrating a control flow performed by the signal generation unit 110 illustrated in FIG. 2. In step S1, the signal generation unit 110 acquires information about the movement direction and position of the driven object 2. In step 2, the signal generation unit 110 acquires the value of a period based on the acquired information. In step 3, the signal generation unit 110 outputs a signal with the acquired period. The signal generation unit 110 performs this processing based on a predetermined period (1 millisecond).

Figure 9:
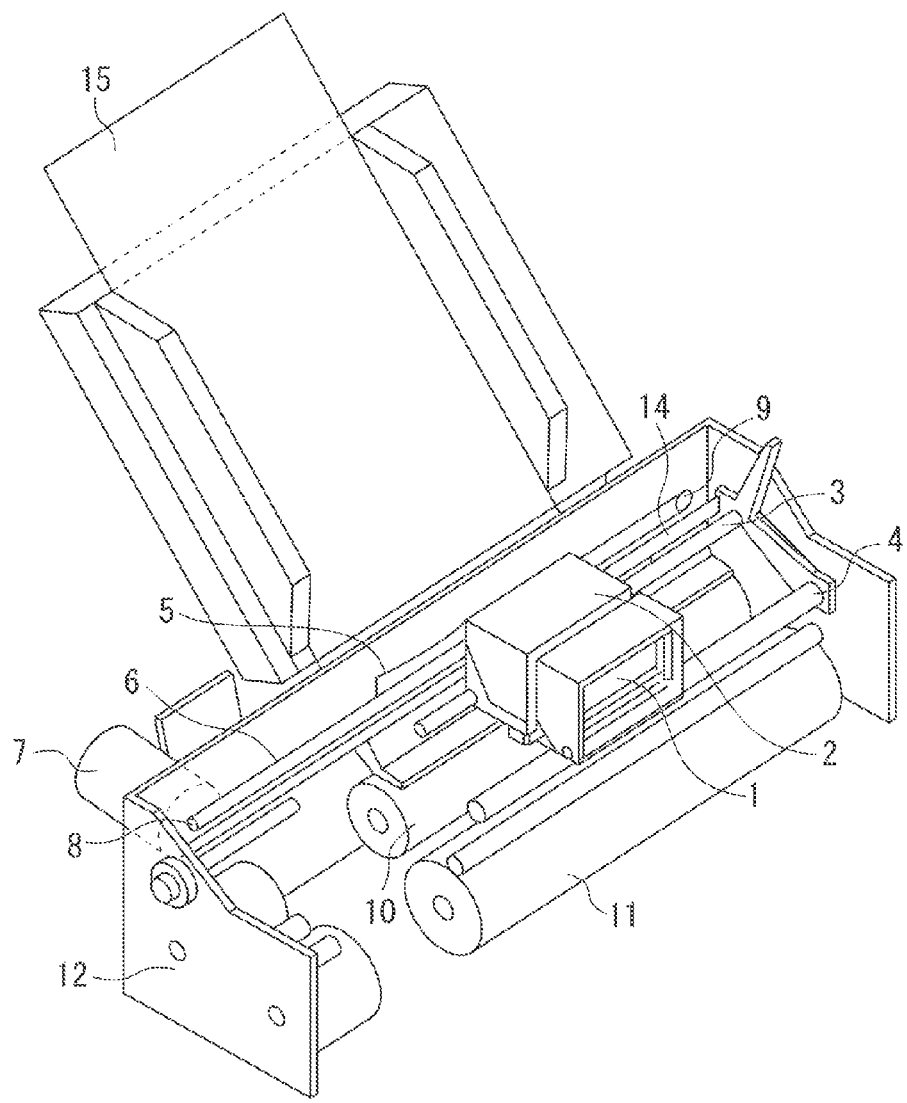
FIG. 9 is a perspective view of a recording apparatus.

FIG. 9 illustrates an example when the electronic apparatus is applied to a recording apparatus.

As illustrated in FIG. 9, a recording head 1 is mounted on a carriage 2. The carriage 2 corresponds to the driven object 2 illustrated in FIGS. 1A and 1B. The carriage 2 is moved while being supported and guided by a main guide rail 3 and a sub guide rail 4. The main guide rail 3 and the sub guide rail 4 are guide members disposed so that the carriage 2 is arranged in the direction intersecting a conveyance direction of a recording medium 15, and the recording head 1 is arranged so as to generally maintain a predetermined distance from the recording medium 5.

At the carriage 2, a control signal and image data are transmitted from a control unit of the recording apparatus to the recording head 1 via a flexible board 5. This recording apparatus performs a recording operation in a forward-path direction and a recording operation in a rearward-path direction.

The belt 6 is stretched around the pulley (motor pulley) 8 coupled to the motor 7, and the pulley (driven pulley) 9. The carriage 2 is fixed to the belt 6. A conveyance roller 10 conveys the recording medium 15 by being driven by a conveyance motor. A discharge roller 11 discharges the recording medium 15 with an image recorded thereon to the outside of the recording apparatus. A casing 12 contains the main guide rail 3, the sub guide rail 4, and others fixed thereto, thereby establishing the above-mentioned mechanism.

The electronic apparatus is not limited to the recording apparatus. For example, the electronic apparatus may be embodied by, for example, an image reading apparatus (scanner) for driving a reading unit equipped with a line sensor to scan a document.

Figures 10A, 10B:
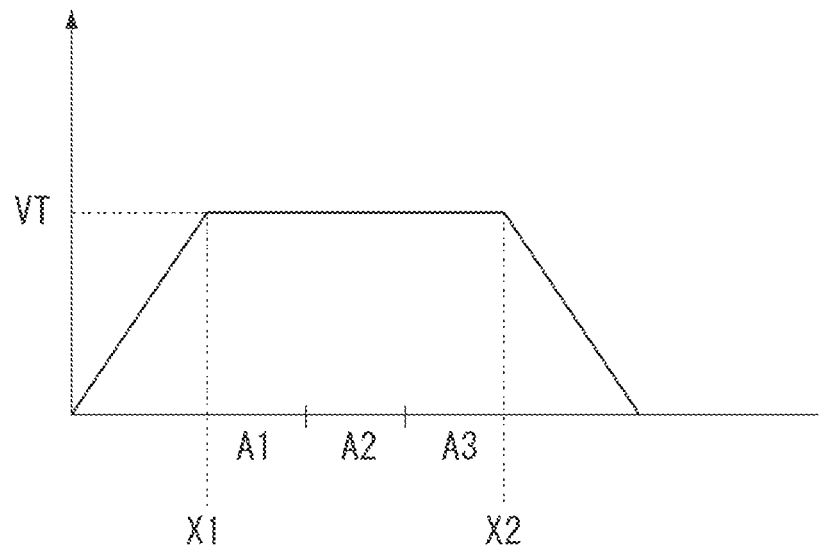
FIGS. 10A and 10B illustrate a periodic signal.

The first exemplary embodiment has been described above, in which the value of the period of the periodic signal is corrected based on the belt elongation amount. However, instead thereof, a phase θ may be corrected. For example, as illustrated in FIG. 10A, the constant speed control region X1-X2 is divided into tree control regions A1, A2, and A3, and the adjustment value of the phase θ is determined for each of them. As illustrated in FIG. 10B, the adjustment value of the phase θ is determined for each of the forward path and rearward path.

Further, with reference to FIG. 6C, the example of dividing each moving range into three regions (first region, second region, and third region) for each direction has been described above. However, the number of the divided regions is not limited thereto, and the number of the divided regions may be another value (4 or 5) larger than three. Further, the exemplary embodiments have been described based on an example of using the belt as the transmission member, but the present invention may be applied to a case in which any other stretchable transmission member is used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-019449 filed Jan. 29, 2010, which is hereby incorporated by reference herein in its entirety.

What is claimed is:

1. An apparatus comprising:
   a carriage;
   an encoder configured to output a signal according to a movement of the carriage;
   a movement mechanism configured to reciprocate the carriage, wherein the movement mechanism includes a motor, a motor pulley connected to the motor, a driven pulley, and a belt stretched between the motor pulley and the driven pulley, and having two belt sections configured to move between the motor pulley and the driven pulley in opposite directions to each other, along with rotation of the motor pulley, the carriage being supported on either of the two belt sections,
   wherein the carriage moves from a first side near the driven pulley toward a second side near the motor pulley as a first directional movement and the carriage moves from the second side toward the first side as a second directional movement, and wherein an elongation of the belt in the first directional movement is different from that in the second directional movement;
   a signal generation unit configured to generate a first control signal, according to a drive instruction and position information based on the signal output from the encoder, and to generate a second control signal having a period used for compensating cogging torque ripples of the motor; and
   a driving unit configured to drive the motor using the first control signal and the second control signal,
   wherein, the signal generation unit sets a first value of the period of the second control signal for a maximum constant speed in the first directional movement, and a second value of the period of the second control signal for a maximum constant speed in the second directional movement, respectively, and the first value and the second value are different according to the elongations of the belt.

2. The apparatus according to claim 1,
   wherein, in each of the first directional movement and the second directional movement, the carriage is configured to switch from an acceleration movement to the maximum constant speed movement, and to switch from the maximum constant speed movement to a deceleration movement after passing through a maximum constant speed region, and
   wherein the first value for the maximum constant speed region in the first directional movement, is set to be smaller than the second value for the maximum constant speed region in the second directional movement.

3. The apparatus according to claim 2,
   wherein, in the first directional movement, the carriage is configured to be pulled toward the second side by a belt part between the motor pulley and the carriage in one of the two belt sections, on which the carriage is supported, and
   wherein, in the first directional movement, as the carriage comes close to the motor pulley in the maximum constant speed region, a value of the period of the second control signal becomes smaller.

4. The apparatus according to claim 3,
   wherein, in the second directional movement, the carriage is configured to be pulled toward the first side by a belt section consisting of one of the two belt sections, on which the carriage is not supported, and a belt part between the driven pulley and the carriage in the other one of the two belt sections, on which the carriage is supported, and
   wherein, in the second directional movement, as the carriage comes away from the motor pulley in the maximum constant speed region, a value of the period of the second control signal becomes smaller.

5. The apparatus according to claim 1, wherein the carriage includes a recording head or a reading unit.

6. An apparatus comprising:
   a carriage;
   an encoder configured to output a signal according to a movement of the carriage;
   a movement mechanism configured to reciprocate the carriage, wherein the movement mechanism includes a motor, a motor pulley connected to the motor, a driven pulley, and a belt stretched between the motor pulley and the driven pulley, and having two belt sections configured to move between the motor pulley and the driven pulley in opposite directions to each other, along with rotation of the motor pulley, the carriage being supported on either of the two belt sections,
   wherein the carriage moves from a first side near the driven pulley toward a second side near the motor pulley as a first directional movement and the carriage moves from the second side toward the first side a second directional movement, and wherein an elongation of the belt in the first directional movement is different from that in the second directional movement;
   a signal generation unit configured to generate a first control signal, according to a drive instruction and position information based on the signal output from the encoder, and to generate a second control signal having a period used for compensating cogging torque ripples of the motor; and
   a driving unit configured to drive the motor using the first control signal and the second control signal,
   wherein, in each of the first directional movement and the second directional movement the carriage is configured to switch from an acceleration movement to a maximum constant speed movement at a first position, and to switch from the maximum constant speed movement to a deceleration movement at a second position after passing through the first position and a maximum constant speed region, and
   wherein, in the first and the second directional movements, the signal generation unit sets, in the maximum constant speed region, a value of the period of the second control signal at a position near the first position to be different from a value of the period of the second control signal at a position near the second position according to the elongations of the belt.

7. The apparatus according to claim 6,
   wherein, in the first directional movement, the carriage is configured to be pulled toward the second side of the motor pulley by a belt part between the motor pulley and the carriage in one of the two belt sections, on which the carriage is supported, and
   wherein, in the first directional movement, as the carriage comes close to the motor pulley in the maximum speed region, a value of the period of the second control signal becomes smaller.

8. The apparatus according to claim 7, wherein
   wherein, in the second directional movement, the carriage is configured to be pulled toward the first side of the driven pulley by a belt section consisting of one of the two belt sections, on which the carriage is not supported, and a belt part between the driven pulley and the carriage in another one of the two belt sections, on which the carriage is supported, wherein, in the second directional movement, as the carriage comes away from the motor pulley in the maximum constant speed region, a value of the period of the second control signal becomes smaller.

9. The apparatus according to claim 6, wherein the carriage includes a recording head or a reading unit.

* * * * *